(12) United States Patent
Capizzo

(10) Patent No.: US 8,444,891 B2
(45) Date of Patent: May 21, 2013

(54) CARBON NANOTUBE (CNT) EXTRUSION METHODS AND CNT WIRE AND COMPOSITES

(76) Inventor: Peter David Capizzo, Madison, AL (US)

( * ) Notice: Subject to any disclaimer, the term of this patent is extended or adjusted under 35 U.S.C. 154(b) by 190 days.

(21) Appl. No.: 12/946,331

(22) Filed: Nov. 15, 2010

(65) Prior Publication Data

US 2011/0121495 A1 May 26, 2011

Related U.S. Application Data

(62) Division of application No. 11/756,076, filed on May 31, 2007, now Pat. No. 7,833,355.

(60) Provisional application No. 60/803,740, filed on Jun. 2, 2006.

(51) Int. Cl.
*B29C 43/22* (2006.01)

(52) U.S. Cl.
USPC ............................................................ 264/70

(58) Field of Classification Search ...................... 264/70
See application file for complete search history.

*Primary Examiner* — Larry Thrower
(74) *Attorney, Agent, or Firm* — John A. Artz; Dickinson Wright PLLC

(57) ABSTRACT

A carbon nanotube (CNT) extrusion system includes a carbon source, an extrusion die having a baseplate having a plurality of die sets, each die set has a plurality of through-holes in fluid communication with the carbon source and a corresponding plurality of template tubes connected at one end to the baseplate and coaxial with the through-holes, each template tube includes a catalyst for forming a CNT structure in combination with the carbon source. An oscillating mechanism operatively associated with the free end of each template tube axially oscillates the template tubes to alternately form and release the CNT structure within each template tube in a continuous manner. The oscillating mechanism can be an alternating electric field or magnetic field applied to the template tubes, the frequency of the electric or magnetic field being synchronized with a formation rate of the CNT within the template tubes.

9 Claims, 5 Drawing Sheets

CARBON NANOTUBE (CNT) EXTRUSION METHODS AND CNT WIRE AND COMPOSITES

CROSS-REFERENCE TO RELATED APPLICATION

This application is a divisional application of U.S. application Ser. No. 11/756,076, filed May 31, 2007, now issued as U.S. Pat. No. 7,833,355, which claims the benefit of U.S. Provisional Application Ser. No. 60/803,740 filed Jun. 2, 2006, titled "Carbon Nanotube (CNT) Extrusion Methods and CNT Wire and Composites".

TECHNICAL FIELD

The present invention relates to carbon nanotube (CNT) wire and composites, and methods for making the same.

BACKGROUND

One of the greatest problems facing space programs has been, and continues to be, the cost of putting payloads into space. That cost is a direct consequence of the launch system weight required to get a given payload out of the earth's gravity well. With current technology, that equates to about $25,000 or more for every 1 pound of payload just to get to orbit. Lunar or Mars missions will cost much more.

In an effort to reduce this cost ratio, space agencies have implemented payload-to-orbit cost reduction initiatives. These initiatives have included several new technologies and demonstrator programs. The objective was to bring the payload cost down to $1000/pound or less. However, this objective has proven elusive. For example, testing of lightweight composite tanks indicated that they may not be able to meet launch stresses. The conclusion is that the composite strength required for large lightweight tanks is not achievable with present day materials. But, these types of tanks will be crucial for reducing lift cost significantly and achieving reasonable Lunar and Mars mission cost.

Also, a big problem facing the automotive industry in its efforts to convert to hydrogen fuel is how to store large amounts of hydrogen on the vehicles. A good solution is to compress the hydrogen to very high pressures, over 10,000 psi. But, the safety and reliability of present day composite fuel tanks at these high pressures is questionable.

There was a new material breakthrough discovery made in 1991 by Sumio Iijima of NEC Laboratory in Tsukuba Japan, on a new type of carbon structure called a carbon nanotube (CNT). These tubes actually are abundant in nature and have been around forever. The outstanding properties of CNT were not realized until Iijima determined that they were tubular graphene pieces. The carbon bond of graphene ($sp^2$) is stronger than that of diamond ($sp^3$). CNT can now be readily made in laboratories. A high energy arc through a carbon rod produces carbon soot, which contains CNT. The significance of the tubular shape is that the graphene sheet is rolled into a continuous crystal structure giving it a tensile strength stronger than any other known material. CNT can be over 100 times stronger than steel, with a strength to weight ratio 30 times greater then Keeler. Suddenly, hypothetical structures (like a space elevator) have become theoretically possible.

Since the discovery of the properties of CNT, there has been an enormous amount of research on CNT and efforts to commercialize it. However, a big drawback to commercial applications is that the tubes can only be made several micrometers long at best. This short length eliminates the possibility of spinning or weaving them into optimal fibers or wires. If CNT wire could be made, it could be woven into composite materials for composite tanks and other lightweight structures for space applications. The high tensile strength of CNT wire will allow much greater burst pressure in composite tanks, enabling them to withstand the launch stresses. This same technology can be used to produce the needed very high pressure hydrogen fuel tanks for the automobile industry. Also, CNT wire in struts, beams, and panels will allow lighter and more fuel efficient transportation vehicles like cars, trucks, and planes; will enhance the building industry allowing longer bridges and taller buildings; and will greatly enhance military armored vehicles and body armor capabilities.

Presently, CNT made in a controlled manner in industry and laboratories is grown. One method now used to grow CNT is to place catalyst dots on a baseplate or substrate. Growth is from the bottom up, as the catalyst adds carbon atoms to the tube. One study showed that the catalyst clusters actually oscillate from dome to rod shapes and back (shape-shift) as the tubes grow. Historically, the tube's growth stops after it becomes a few micrometers long due to the tube's mass exceeding the catalyst capability.

What is needed then is to produce CNT in continuous extruded wire form, and to weave these wires into fabrics for incorporation into composite materials, enabling very high strength lightweight fuel tanks, structural members, and armor.

SUMMARY OF THE INVENTION

The present disclosure is directed toward a novel use of the catalyst action of shape-shifting to achieve longer CNT lengths. The method significantly differs from present tube growth methods in that, to produce CNT wire, an extrusion process is utilized. Present tube growth forming methods result in tubes that are much too short to perform a spinning action to produce a CNT yarn or weaved cable of significant strength. Even with tubes long enough to spin, the fiber strength will be limited to the interconnecting bond between tubes. What is needed is a continuous extrusion method of making CNT continuous wire, so that the CNT strength is maintained through the entire length of the wire or cable. But the continuous part of the process needs only be the net result. That is, a discrete step-by-step oscillator can build on the forming end of a CNT without the physical limits of a catalyst, and the net result is an endless extrusion.

One embodiment provides that, instead of the catalyst being placed on a substrate in the form of a dot, it is formed into a tube itself, and the CNT forms as carbon flows through the catalyst tube. In addition, the catalyst tube is externally controlled and made to shape-shift as required to form CNT extrusions. Because it is in the shape of a tube, when it is stretched, its inside diameter will decrease; when it is compressed, its inside diameter will increase. As carbon is made to flow through the tube by an external pressure, the catalyst action of the tube forms the carbon into CNT. The CNT formation plugs the tube, causes a back pressure, and stops the flow of carbon through the tube. However, by forcing the tube to compress, its inside wall will expand, thereby releasing the formed CNT and backpressure. Then, by quickly stretching the tube to close its walls back down before the CNT completely exits, more carbon can build on the back end of the CNT, making it longer with the same diameter. Repeating this process in an oscillatory manner, to first form and then release the CNT, produces a continuous CNT wire out the end of the catalyst tube.

In one embodiment, a carbon nanotube (CNT) extrusion system includes a carbon source, an extrusion die having a baseplate having a plurality of die sets, each die set has a plurality of through-holes in fluid communication with the carbon source and a corresponding plurality of template tubes connected at one end to the baseplate and coaxial with the through-holes, each template tube includes a catalyst for forming a CNT structure in combination with the carbon source. An oscillating mechanism operatively associated with the free end of each template tube axially oscillates the template tubes to alternately form and release the CNT structure within each template tube in a continuous manner. The oscillating mechanism can be an alternating electric field or magnetic field applied to the template tubes, the frequency of the electric or magnetic field being synchronized with a formation rate of the CNT within the template tubes.

In another aspect of the invention, a carbon nanotube (CNT) extrusion system, includes a carbon source; an extrusion die having a template tube in fluid communication with the carbon source, the template tube including a catalyst for forming a CNT structure in combination with the carbon source; and an oscillating mechanism operatively associated with the template tube for axially oscillating the template tube to alternately form and release the CNT structure in a continuous manner. The template tube can be at least one of silicon carbide, boron carbide, cobalt, nickel, iron, or carbon. Alternatively, the template tube can be a CNT having a larger diameter than the CNT structure to be formed.

A method of continuously forming a CNT is also provided. The method includes providing a source of carbon; providing an extrusion die comprising a template tube in fluid communication with the carbon source, the template tube including a catalyst for forming a CNT structure in combination with the carbon source; introducing the carbon into the template tube to initially form a CNT structure; and thereafter, repeatedly axially oscillating the template tube at a frequency corresponding to a formation rate of the CNT structure to alternately form and release the CNT structure in a continuous manner. The step of axially oscillating the template tube can include electrically charging the template tube and applying an externally oscillating electric field to the template tube such that it to stretches and compresses in an oscillating manner.

The extrusion die can be a stationary first plate and a moveable second plate, with the template tube extending between the two plates, and wherein the step of oscillating comprises oscillating the second plate back and forth with respect to the first plate to alternately axially compress and stretch the template tube at a rate synchronized with a formation rate of the CNT within the template tube.

The extrusion die can be made by providing a porous anodic alumina (PAA) baseplate with an etched hole; electrochemically plugging the hole; anodizing nano-channel alumina (NCA) onto the baseplate, using the plugged hole as an alignment template for a second anodizing process; electrochemically depositing a catalyst into the bottom of the NCA hole, on top of the plug; forming the CNT template tube in the NCA hole by a chemical vapor deposition (CVD) process; etching out the catalyst and plug to leave a clean through-holes through the PAA baseplate and template tube; and, thereafter, etching away a portion of the NCA such that one end of the template tube is connected to and extends from NCA and PAA baseplate, the free end of the template tube capable of being oscillated.

The resulting continuous extrusions of CNT can be fed into a spinning mechanism to form strands, wire, cable, yarn, fabric or the like. A combination of continuous extrusions and segments of CNT can also be used to form such structures.

Other advantages and features of the invention will become apparent to one of skill in the art upon reading the following detailed description with reference to the drawings illustrating features of the invention by way of example.

BRIEF DESCRIPTION OF THE DRAWINGS

For a more complete understanding of this invention, reference should now be made to the embodiments illustrated in greater detail in the accompanying drawings and described below by way of examples of the invention.

In the drawings.

DETAILED DESCRIPTION

While the present invention is described with respect to a method and apparatus for extruding CNT to form CNT stranded or solid wire, the present invention may be adapted and utilized for creating long-strand CNT for other uses including CNT extrusions spun or woven into filaments, fibers, strands, strings, rope, cable, yarn, fabric or twine. These materials can comprise continuous extrusion CNT, or long-stranded CNT, or combinations of continuous and long-stranded CNT.

In the following detailed description, spatially orienting terms may be used such as "left," "right," "vertical," "horizontal," and the like. It is to be understood that these terms are used for convenience of description of the components or embodiments by reference to the drawings. These terms do not necessarily describe the absolute location in space, such as left, right, upward, downward, etc., that any part must assume.

In the following description, various operating parameters and components are described for several constructed embodiments. These specific parameters and components are included as examples and are not meant to be limiting.

Figure 1:
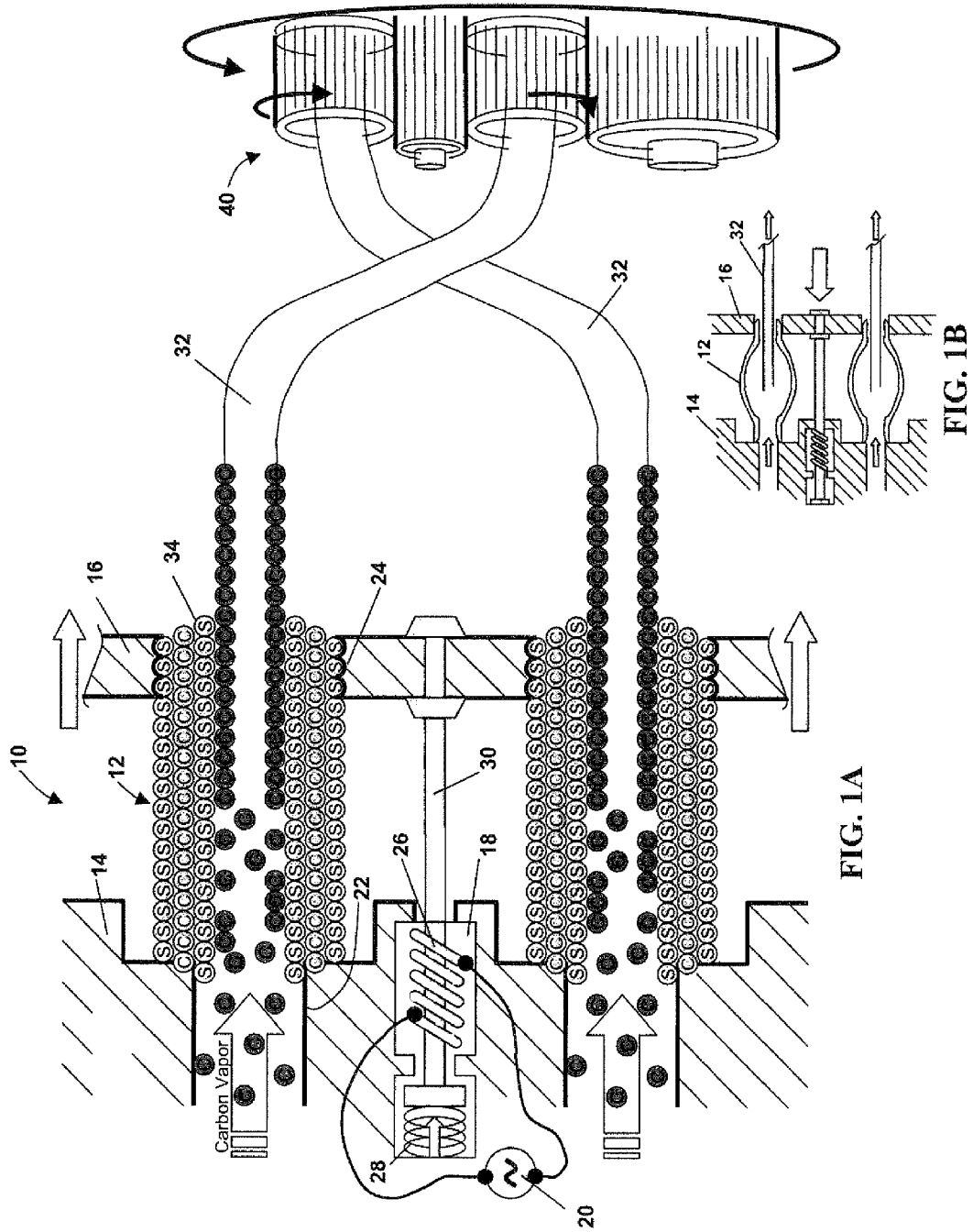
FIG. 1 shows a schematic diagram of a CNT wire extrusion process according to an embodiment of the present invention.

Referring now to the drawings wherein like reference numerals are used to identify identical components in the various views, FIG. 1 illustrates a schematic diagram of a CNT wire extrusion process according to an embodiment of the present invention. Specifically, FIG. 1A shows one example of a CNT extrusion process during the CNT forming state, and FIG. 16 shows the exemplary embodiment of CNT extrusion during the CNT release state. The system 10 comprises a plurality of catalyst tubes 12 which are each shown connected to a stationary baseplate 14 at one end, and to a movable plate 16 at the other end. The movement of the oscillating plate 16, in this example, is controlled by a solenoid 18 operatively connected to a controller 20 which may be a suitable power source 20. The controller may also be a more sophisticated device such as a microprocessor-based controller which provides control of the solenoid 18. In such a case, controller 20 may include a microprocessor in communication with input ports, output ports, and computer readable media via a data/control bus. Computer readable media may include various types of volatile and nonvolatile memory such as random access memory (RAM), read-only memory (ROM), and keep-alive memory (KAM). These "functional" descriptions of the various types of volatile and nonvolatile storage may be implemented by any of a number of known physical devices including but not limited to EPROMs, EEPROMs, PROMs, flash memory, and the like. Computer readable storage media include stored data representing instructions executable by microprocessor to implement the method for CNT extrusion according to an embodiment of the present invention. Controller 20 may communicate with the various sensors and actuators via an input/output (I/O) interface. Such sensors may include temperature and pressure sensors.

The catalyst template tubes 12 shown are silicon-carbide. Silicon-carbide has been shown to be a good catalyst for growing CNT, and may be a good candidate for a catalyst tube. The catalyst tubes 12 can be thought of as templates in this extrusion process. Some other catalysts used on plates have been cobalt, nickel, and iron, all of which may possibly be used in making the templates. Because of the carbon-carbon bond length, boron and silicon fit best within the graphite hexagonal structure, making them very good template ingredient candidates.

In operation, the oscillating action of the plate 16 relative to the stationary plate 14 results in the template tubes 12 being compressed and opened (FIG. 1B), while the movement of the plate 16 apart from the stationary plate 14 results in the template tubes being stretched, or elongated, and closed (FIG. 1A). The stationary plate 14 and the oscillating plate 16 each have a plurality of through-holes 22, 24. Each template tube 12 is attached at one end to an opening 22 in the stationary plate, and attached at the other end to an opening 24 in the oscillating plate. The through-holes 22 of the first plate 14 are co-axial with the through-holes 24 of the second plate 16. The through-holes in the first plate 14 allow the flow of carbon vapor through the template tube 12 in a controlled manner.

FIG. 1A shows the oscillating mechanism as a solenoid 18 having electromagnetic coils 26 and springs 28 being employed to move the second plate 16 back and forth with respect to the first plate 14 by way of a control rod 30. However, in practice the oscillating mechanism can comprise any number of more robust mechanisms on a microscopic level. For example, the movable second plate 16 can be permanently magnetized with a ferrous doping, and an oscillating magnetic field applied upon it to get it oscillating at the proper frequency for the extrusion process to take place.

As the carbon vapor passes through the first plate 14 and into the catalyst template tube 12, the carbon bonds to form a CNT extrusion 32. As carbon in the form of vapor is made to flow through the template tube 12 by an external pressure, the catalyst action of the template tube 12 forms the carbon into CNT. The CNT formation plugs the template tube 12, causes a back pressure, and stops the flow of carbon through the template tube 12. However, by forcing the template tube 12 to compress by movement of the second plate 16 towards the first plate 14, the inside wall of the template tube 12 will expand, as shown in FIG. 1B, thereby releasing the formed CNT and backpressure. Then, by moving the second plate 16 away from the first plate 14, the template tube 12 is quickly stretched, thereby closing its walls back down before the CNT completely exits. As a result, more carbon can build on the back end of the forming CNT, making it longer and with the same diameter. Repeating this process in an oscillatory manner, to first form and then release the CNT, produces a continuous CNT 32 out the end 34 of the catalyst template tube 12. Thus, the spinning mechanism 40 can be any one of the known forms for creating such structures from single strands which, in this case, are CNT extrusions.

Once formed, the CNT extrusions 32 can be fed into a spinning mechanism 40 or the like to braid or otherwise twist the strands 32 into a bundle of strands. The CNT extrusions 32 can be spun or woven into any number of known forms such as twisted pairs, braided CNT, bundles, filaments, fibers, strands, strings, rope, cable, yarn, fabric or twine. These forms can be further woven into fabrics or the like.

To facilitate the growth of the catalyst template tubes 12, a scaffold structure can first be made on the baseplate 14. The composition of the scaffold has a natural tendency to attract and bind the desired catalyst materials in the proper lattice configuration. One method of building a wire scaffold uses genetically engineered viruses that bind zinc or cadmium sulfide particles linearly to the outside surface of the virus, forming a wire structure. The organic material of the virus can then be thermally or chemically etched away, leaving the desired catalyst tube standing.

An alternative form of the catalyst template tube 12 follows. It is also known that CNT forms in different layers, making multi-walled CNT. This permits an alternate template tube, in the form of a larger CNT itself. Once a CNT starts to grow, additional layers of CNT can form over it spontaneously. Any solidifying element on a surface tends to arrange in accordance with the surface crystal lattice, if possible. By making the surface crystal lattice graphene, the solidifying carbon would fit perfectly into it, and also form a graphene face. Therefore, to make the template tubes 12, CNT can simply be grown as is normally done off an appropriate baseplate 14.

The catalyst template tubes 12 must be attached to each of the first plate 14 and second plate 16. The attachment bonding must be such that the template tubes 12 remain attached during extrusion oscillations of the tubes, however, the attachment bond depends largely on the catalyst used for CNT growth. Also needed, is a method to make the through-holes in the baseplate in alignment with the tubes themselves. In addition, in order to form real world manageable size wires, enough CNT wire stands should be extruded simultaneously from a single baseplate extrusion die forming macro-size wire strands (the typical CNT is a few nanometers in diameter).

One solution uses either electronic photolithography methods, or a highly controlled anodizing process, for deposition of catalyst dots and etching of through holes to form millions of extrusion tubes on a single baseplate 14 of similar size and length. One example of the anodizing method uses an aluminum baseplate and a cobalt catalyst. A nano-channel alumina (NCA) can be formed on an aluminum substrate by an anodizing method, and a cobalt catalyst is deposited in the NCA holes where CNT was subsequently grown. This process is taken further in this disclosure for the purpose of forming an extrusion die.

Figure 2:
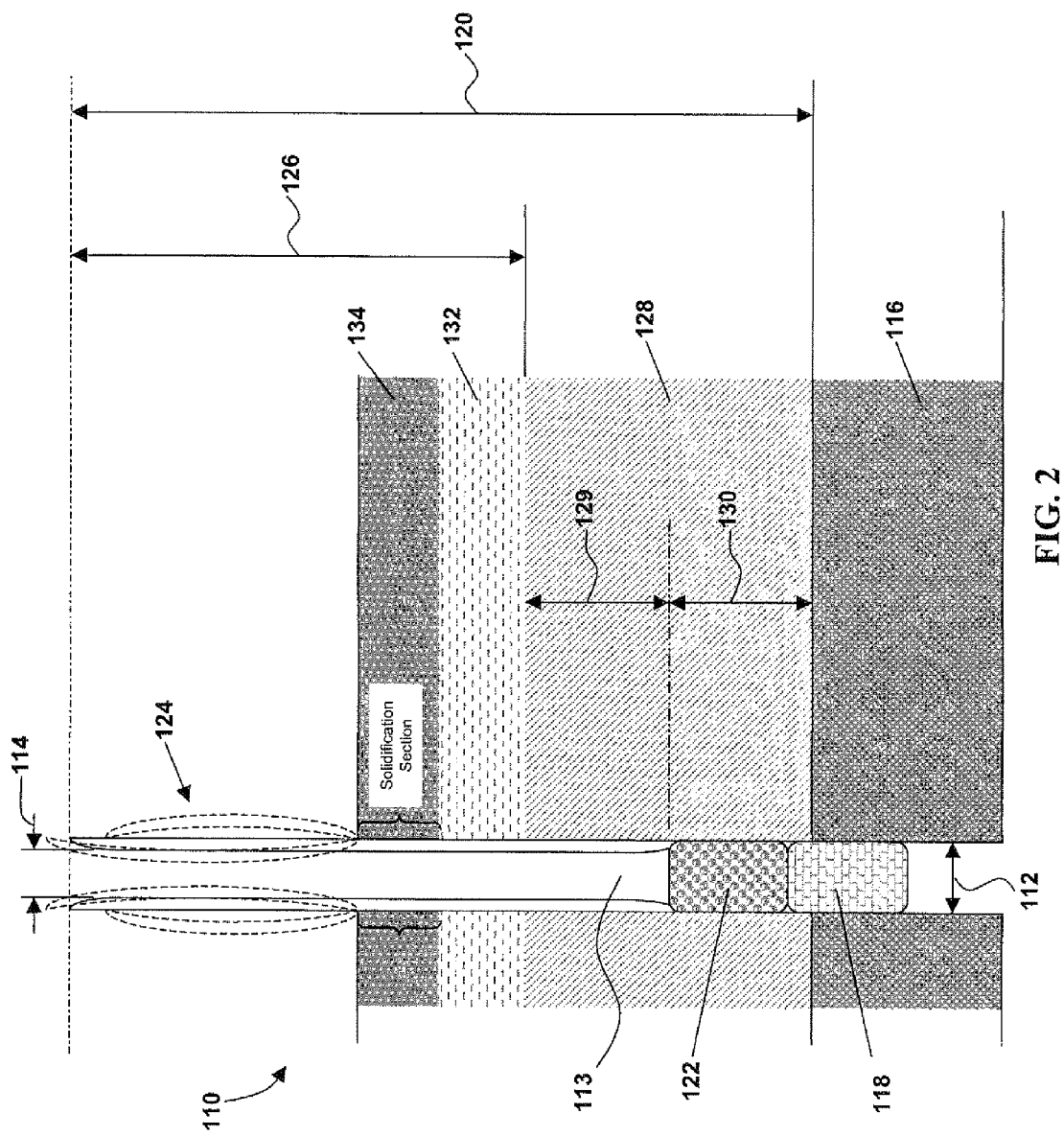
FIG. 2 shows a schematic diagram of an individual CNT template stackup within the extrusion die during the CNT forming state.

Accordingly, FIG. 2 shows a schematic diagram of an individual CNT template stackup within the extrusion die 110 during the CNT forming state. Thus, FIG. 2 represents a detail of one template tube 124 within a die 110 having a plurality of template tubes. In this example, a 50 nm through-hole 112 results in an approximately 40 nm CNT diameter at the die exit 114. In an initial step, the aluminum baseplate 116 is prepared by making through holes in it by using a Porous Anodic Alumina (PAA) template method and ion etching. In this example, the PAA prepared baseplate 116 with through-holes is approximately 1000 nm thick. In a next step, the holes 112 are electrochemically plugged with a nickel plug 118. The NCA 120 is then anodized onto the baseplate 116, using the nickel plugged holes 118 as an alignment template for the second anodizing process. The starting thickness of the NCA in this example is about 1000 nm, and includes a plurality of holes 113 aligned with the holes 112 formed in the baseplate 116. In a next step, a cobalt catalyst 122 is then electrochemically deposited into the bottom of the NCA holes 113, on top of the nickel plugs 118 in the baseplate openings 112. Then, the CNT template tubes 124 are formed or grown in the NCA holes 113 by a standard Chemical Vapor Deposition (CVD) process utilizing the cobalt catalyst 122. Next, the cobalt catalyst 122 and nickel plugs 118 are then etched out of the holes 112, 113, leaving clean through holes through the aluminum baseplate 116 and CNT template tubes 124. To complete the die fabrication, the NCA 120 is ion etched down to an appropriate height 126, so that the CNT template tubes 124 are now free-standing from the baseplate 116 and remaining NCA 128. The template tubes 124 are free to be oscillated for the extrusion process. In this example, the NCA was etched down from 1000 nm to approximately 500 nm after the template tube 124 was grown. The remaining portion 128 of NCA left on the baseplate, retains and bonds the CNT template tubes 124 to the baseplate 116, and can act as a good thermal insulator. For example, approximately 250 nm of NCA 129 aides in retaining the template tubes 124, while approximately another 250 nm of NCA 130 was used to aide in providing catalyst for CNT template tube growth. Additional layers can be deposited on the NCA after it is etched down. A thin insulator layer 132 and an aluminum coldplate 134 can be CVD deposited on top of the surface of the NCA 128. The coldplate layer 134 is used to thermally control the carbon condensation rate within the CNT template tube during the extrusion process.

FIG. 3A shows a plan view of the complete die 110 of FIG. 2; and FIG. 3B shows a side sectional view of the die 110 of FIG. 3A along section lines B-B. The die 110 has seven 50 μm diameter extrusion hole sets 111 in a hexagonal pattern. Of course, more or fewer extrusion hole sets could be used. As well, any number of 50 nm holes 112, 113 could be in each hole set 111. In this example, each hole set 111 contains about 200,000 extrusion holes 112, 113 with a 50 nm template tube 124 inside each. Each hole produces a 40 nm diameter CNT strand through the template tubes 124. The strand diameter depends on the template tube diameter opening. Thus, openings larger or smaller than 50 nm could also be used. This configuration of seven holes sets 111 with hundreds of thousands of extrusion holes each, will produce a multi-stranded CNT wire of about 0.15 mm diameter from a single extrusion die 110 which is approximately 8 mm square. Larger or smaller diameter wires can be made by simply adding or subtracting hole sets in the extrusion die. A single hole set will produce a stranded wire of about 50 μm diameter, which is several times thicker than a human hair. Adding multiple extrusion dies to the vapor chamber wall will enable even larger diameter wires and cables.

FIG. 3B shows a side sectional view of the die 110 of FIG. 3A. The Figure shows the baseplate 116, etched NCA layer 128, insulator 132 and coldplate 134. The template tubes (not to scale or number) 124 can be seen to extend from the die 110. The thickness of the baseplate above the hole sets, NCA layer, Insulator, and coldplate stack-up (1.7 μm) is also indicated relative to the over-all die thickness (2 mm), as well. Again, these specific numbers are merely an example. They are not intended to be limiting. Recesses 135 are also provided in the interior surface 136 of the die 110 for passing carbon vapor to the template tubes 124 for CNT growth. Again, the configuration shown is merely one example of a die 110 according to the present invention. It is not meant to be limiting.

Figure 3:
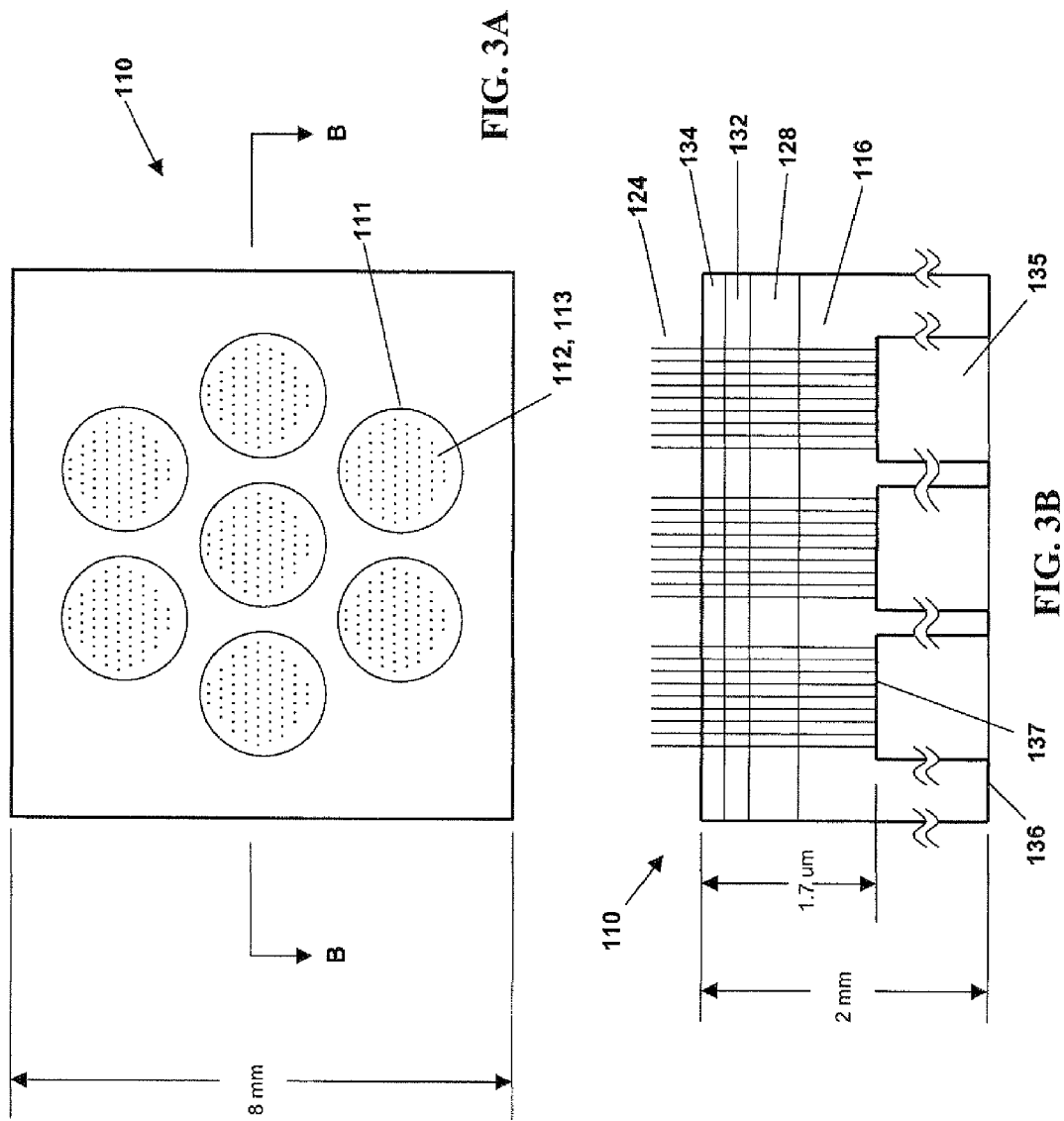
FIG. 3 shows plan and side views of a CNT extrusion die with an exemplary extrusion hole set.

The following describes one example of a process for forming a highly ordered porous anodic alumina (FAA) mask on an aluminum baseplate for a CNT extrusion die with reference to FIGS. 2 and 3. The process starts by preparing an aluminum extrusion die baseplate sized for the desired CNT multi-strand wire extrusion diameter. In the example of FIG. 3, a 2 mm thick by 8 mm square plate is suggested for a 0.15 mm multi-strand wire. The baseplate should be high purity (99.999%) aluminum. A number of recessed holes, called the hole set 111, are drilled, milled, or etched out (not to break through) in a pattern that matches the desired wire cross-sectional stranding pattern on the rear side (inside) 136 of the baseplate 116. FIG. 3 shows seven holes 111 in a hexagonal pattern. The recess holes can be to a depth of about 1.0 μm from breaking through, with the bottoms 137 as flat as possible. The recess holes should be big enough to accommodate several thousands of extrusion tube holes 112, 113 to be added later (about 200,000 is suggested), but small enough to maintain the structural integrity of the aluminum baseplate for handling the process temperatures and pressures, with ample wall thickness between the recess holes. In the example of FIG. 3, the holes 111 are about 50 μm in diameter with at least 50 μm wall thickness between the holes 111.

Next, the aluminum baseplate is degreased in trichloroethylene, etched for 1 minute in a sodium carbonate solution (25 g/L) at 80° C., rinsed well in distilled water and immersed in 1:1 v/v nitric acid for 20 seconds at room temperature to neutralize any residual carbonate. After rinsing in triply distilled water, the baseplate is electropolished in a perchloric acid (60%) in ethanol solution (1:4 by volume). Anodization on the baseplate is carried out in a thermally insulated electrolytic cell with 40 V DC applied to a 0.25 M aqueous oxalic acid electrolyte for 15 hours at 10° C. The electrolyte should be vigorously stirred during anodization in order to maintain temperature and electrolyte concentration uniformity. This process will result in a PAA film on top of the baseplate 116 approximately 81 μm thick. The long anodization time in this step allows for self-organization of the oxide to form highly regular aluminum pores in the baseplate. The pore diameters are a function of the anodizing voltage, and they can be varied from five to hundreds of μm wide, (the given parameters in these steps produce 40 μm wide pores). The pore diameters dictate the PAA mask hole diameters to be produced in the next step, which then dictate the diameter of the ion-milled holes 112 through the baseplate. The baseplate ion-milled holes 112 will later enable the Nano-Channel Alumina (NCA) hole 113 alignment.

In a subsequent step, the thick PAA film is stripped off by immersing the baseplate in a solution of phosphoric and chromic acids, leaving behind an aluminum surface textured with a hexagonal scallop pattern of 40 nm wide pores. This is followed by a second anodization step carried out under the same physical and electrochemical conditions used to form the first PAA film. The second anodization is carried out for a sufficient length of time to grow a film 1.0 μm thick, A highly regular and periodic PAA pattern is formed in this second anodization step, do to the highly regular aluminum pores left by the first anodization process acting as a template for the second anodization. This PAA pattern is used as a contact mask for the ion milling process.

The following describes an example of a process for ion milling of the aluminum baseplate, using the PAA mask from the previous step. Ion milling is a process of etching ballistically through a contact mask using highly collimated, high-energy particles such as Ar+ ions. The aluminum baseplate with its PAA film is mounted on a water-cooled copper block using 0.15 mm thick indium foil to improve thermal contact. The assembly is placed in a vacuum chamber and evacuated to $5 \times 10^{-7}$ mbar. The ion milling source uses a Chordis high current ion source (such as a Danfysik, model 920-2) operating with Ar+ accelerated through 25 kV and with an ion current of 13-15 mA. A ~2 cm diameter ion beam is directed normal to the surface of the PAA film.

The aluminum baseplate is ion milled through the PAA mask, until holes break through the thin bottom layers of the recess holes 111 made in the first step. The milling will take several minutes. Milling too fast by applying too much energy will melt the aluminum, and cause it to wet up the PAA mask plugging the holes. A 7 minute milling time at least is suggested. The diameter of the finished ion milled holes should be at least 50 nm, but should not break through to adjacent holes. That is, sufficient wall thicknesses should remain between the holes 112. The 1 µm PAA hole, plus the 1 µm aluminum hole to be milled, gives a 2 µm deep through-hole total. With a starting hole of 40 nm diameter, the hole aspect ratio is 2/0.04=50, which is sufficient for the milling exhaust required.

The ion milled holes 112 in the baseplate now need to be plugged 118 at the top, so that a CNT catalyst can be deposited later into the bottom of the Nano-Channel Alumina (NCA) holes 113 yet to be formed. The remaining PAA mask after ion milling can now be used as a plug deposition mask. In this step, nickel is electrochemically deposited into the aluminum holes, so that an approximately 100 nm long nickel plug 118 forms just at the top of the holes 112, with a good portion of the plug extending up into the PAA mask (about 50% is suggested). The nickel protrusions into the PAA will also act as a alignment template for the NCA deposition process. A chemical etch can then be used to remove the FAA mask and any residual aluminum oxide without affecting the underlying aluminum baseplate or nickel plug. Again, a mixture of phosphoric and chromic acids can be used. The baseplate is now ready for the next step. The following describes a process for forming aligned Nano-Channel Alumina (NCA) on the baseplate. Using the nickel plugged aluminum baseplate from the last step, the top surface is anodized using a 0.3 M oxalic acid solution at 15° C. under a constant voltage of 40 volts, until a 1 µm thick NCA film is formed. The nickel plug protrusions from the baseplate will cause the NCA holes to be perfectly aligned with the baseplate holes. Again, the applied voltage controls the NCA hole diameters, and they should be made 50 nm wide in this example.

The following describes a process for forming carbon nano-tube (CNT) extrusion tubes 124 in the NCA Array. The process continues by electrochemically depositing approximately 100 nm long cobalt catalyst 122 in the bottom of the NCA holes 113, on top of the nickel plugs 118. The bottom side of the baseplate is masked off at this time.

The carbon nanotubes are then grown by first reducing the catalyst by heating the cobalt-loaded NCA and baseplate in a furnace to 600° C. for 4 to 5 hours under a CO flow of 100 cm³/min. The CO flow is then replaced by a mixture of 10% acetylene in nitrogen at a flow rate of 100 cm³/min. The acetylene flow is maintained for 2 hours at 650° C. Then, the extrusion die sample is annealed in nitrogen for 15 hours at 650° C.

Next, both the cobalt catalysts 122 and the nickel plugs 118 are chemically etched out of the holes 113 from the top side of the NCA 120, using the NCA as an etch resist protecting the aluminum. The cobalt catalyst is etched out first using HCL, followed by etching out the nickel plug using HN03. A slight etch-back of the aluminum holes is acceptable, since the diameter the aluminum holes in the baseplate is not critical.

Now that clear straight through holes have been established through the CNT template tubes 124 and baseplate, the NCA 120 needs to be etch down so the CNT tube ends are free to be oscillated during the extrusion process. The NCA is etched down 500 nm, using a mixture of phosphoric and chromic acids to result in the thicknesses shown at 128.

Next, the insulating film 132 and cold plate 134 are formed. Using a chemical vapor deposition process, a 100 nm thick insulating film is deposited on top of the NCA surface. During this step, the top of the CNT template tubes should be masked off. Then, on top of the insulation layer 132, a 100 nm thick aluminum film 134 is electrochemically deposited, to be used as a CNT wire extrusion cooling plate. The CNT wire extrusion die 110 is now complete, and ready for installation into the extrusion jig 190 which is described in greater detail with respect to FIG. 4.

Figure 4:
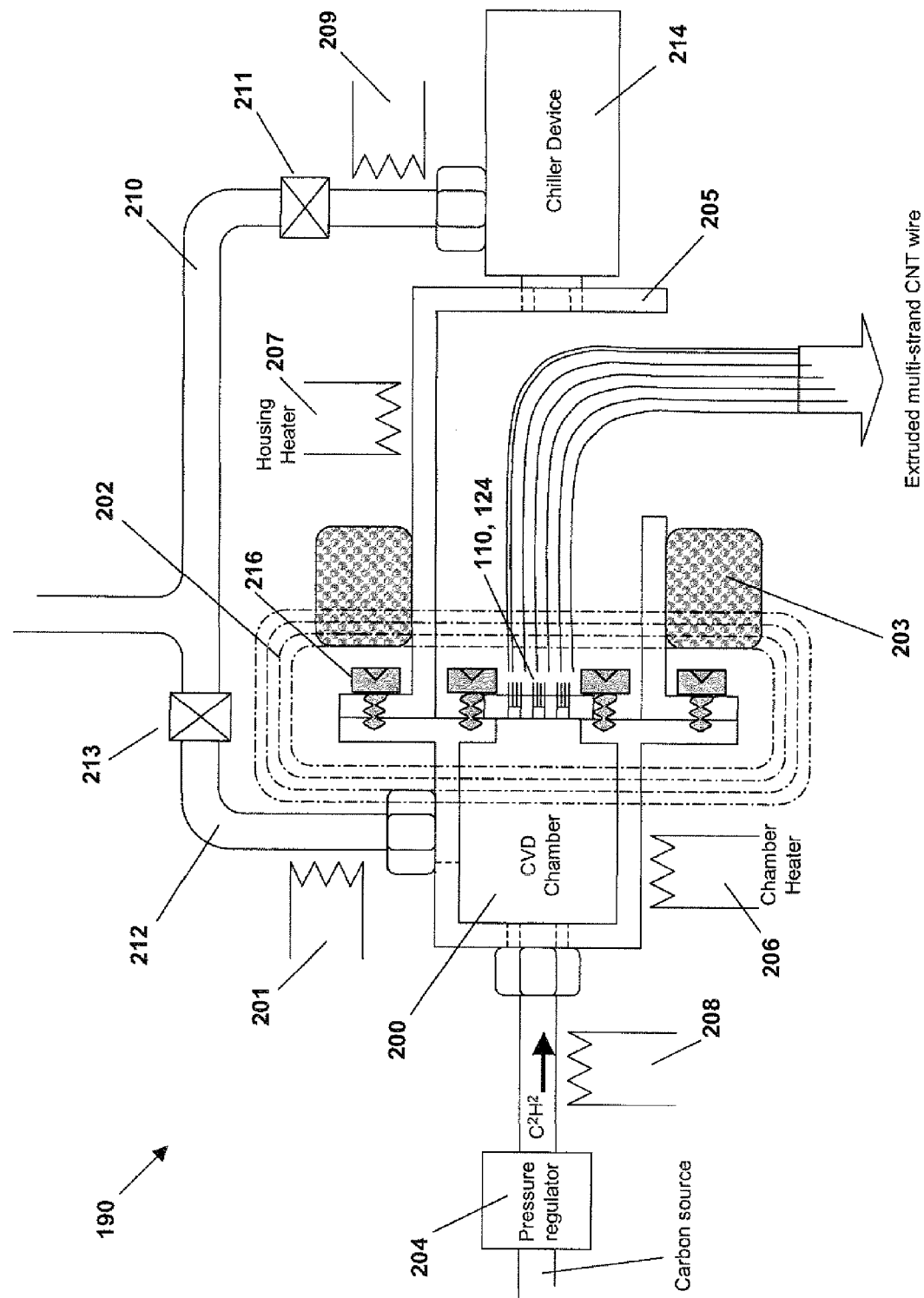
FIG. 4 shows a schematic diagram of a CNT wire extrusion process according to an embodiment of the present invention.

FIG. 4 shows a schematic diagram of a CNT wire extrusion system according to an embodiment of the present invention. In this example, the extrusion die 110 is clamped to a CVD pressure chamber 200 wall orifice using coupling mechanism 216. An electric coil 202 is provided to magnetically couple the template tubes 124 of the die 110 with a perpendicular magnetic field relative to the axial orientation of the template tubes. The CNT extrusion flow through the template tubes of the die 110 is maintained by the pressure within the carbon vapor chamber 200. The pressure is adjusted by a pressure regulator 204 to control the flow rate of carbon during the template tube release cycle. A line heater 208 is coupled to the carbon source feed line in order to pre-heat the carbon source gas, such as methane for example, before entering the CVD chamber 200. A chamber heater 206 is coupled to the CVD chamber 200 in order to assure a carbon vapor is established, and to accurately control the operating temperature of the chamber 200 vapor during the extrusion process. To assist the CNT flow through the template tube, a second, strong magnetic field may be applied by another electric coil 203 in the axial direction of the CNT extrusion flow. This assist process requires a doping of the CNT wire extrusion with iron or ferrous particles, or similarly ferromagnetic phase particles at the condensation temperature within the template tube condensation section. In addition to assisting flow control, the magnetic field can also help prevent the extruded CNT wire strands from curling and clumping upon exiting the extrusion template tubes.

The CVD pressure chamber 200 is attached by coupling mechanisms 216 to a temperature control housing 205 that encloses the CNT wire extrusion as it exits the extrusion die 110. This housing 205 has itself an opening for the exit of the CNT extrusion wire, but can contain any desired ion solution or temperature controlled fluids or gases in support of the extrusion process when properly orientated. The primary purpose of the housing 205 is to provide a controlled temperature environment on the exit surface of the extrusion die 110. Actively controlling the housing environment temperature is a housing heater 207, a nitrogen feed line heater 209, and a chiller device 214. The chiller 214 can be made to chill nitrogen, for example, as it is fed from the nitrogen feed line 210 through valve 211. Alternatively, the chiller can be made to circulate a retained fluid in the housing 205 in order to maintain a controlled environment temperature. A nitrogen purge line 212 is also connected to the CVD chamber 200 with an inline control valve 213 and nitrogen feed line heater 201.

The baseplate 110 is mounted to the pressure chamber 200 so that the carbon can flow through the plate holes and into the template tubes. The other end of the template tubes are thus free to be stretched or compressed by external forces. The carbon pressure is low initially so that the carbon deposits onto the inside walls of the template tubes forming CNT structures, which will subsequently plug the template tubes causing a back pressure. The pressure in the chamber 200 is then raised and the CNT plug is released by compressing the template tubes to make the inside diameter of the tubes bigger. The CNT plugs will then begin to move out of the tubes. By quickly stretching the template tubes again and closing the inside diameter back down, the CNT extrusions stop moving and form longer at the trailing ends toward the extrusion die 110. This process of stretching and compressing the tubes is repeated in an oscillatory manner so that CNT wire is extruded out the ends of the tubes. The frequency of oscillation is made to match the flow rate with the formation rate. The flow rate is a function of chamber pressure and magnetic assist field strength, and the formation rate is a function of condensation parameters. The length of the CNT extrusions is only limited by the desired reel size. The process can create extrusions of carbon nanotube of various chiral shapes, including zigzag and armchair, or any combination of chiral shapes. Additionally, the extrusions of carbon nanotube can be single-wall or multiple-wall structures in any combination of chiral shapes.

The following describes one example of a CNT extrusion process for forming CNT wires of any desired length with reference to FIG. 4.

In a first step, a CNT extrusion die 110 is mounted onto the Chemical Vapor Deposition (CVD) chamber 200, covering the extrusion orifice of the chamber, using 2 set screws 216 sufficiently torqued to prevent leakage of the carbon vapor through the contact surface.

The CVD chamber 200 and temperature control housing 205 is then purged using the nitrogen lines 210, 212 for several minutes. While maintaining a reduced purge flow, the nitrogen lines, carbon source line, CVD chamber, and housing are preheated to 600 C using heaters 201, 209, 208, 206, and 207. Then, the CVD chamber 200 and housing 205 temperatures are raised to 650 C using heaters 206 and 207. Next, the carbon source (acetylene for example) is allowed to flow into the CVD chamber 200 while stopping the purge flow into the CVD chamber using valve 201, and maintaining the housing nitrogen flow through the chiller device 214 at 650 C using line heater 209. The CVD chamber and housing temperatures are maintained at 650 C, ensuring that a good carbon vapor is established, and that the vapor is flowing freely though the extrusion tubes.

In a further step, the housing 205 nitrogen temperature is reduced using the combination of the housing nitrogen line heater 209, the housing heater 207, and the chiller 214, until the carbon vapor condenses within the extrusion template tubes 124, plugging the tubes and completely stopping the flow out of the tubes. The housing temperature and the nitrogen flow are maintained into the housing at this established temperature.

(0060) The CVD chamber 200 pressure is then increased until about 10 nN is applied to the carbon plugs within the extrusion tubes 124 using the carbon source pressure regulator 204. The carbon plugs are not blown out at this point. If they blow out, the pressure should be decreased to allow new plugs to form.

In a further step, an AC current is applied to the electric coupling coil 202, generating an alternating coupling magnetic field with the extrusion tubes. The AC current starting frequency can be set to 530 kHz, the first harmonic of CNT. The current in the coil is then increased from 0.0 amps until the magnetic field produces about 100 nN compression force on the extrusion tubes 124. This force will compress the tubes 124 approximately 50 nm, opening the inside diameter about 2 nm, which is sufficient to break the van der Waals forces, releasing the CNT formed plug in the extrusion tube. The extrusion tube 124 can be stretched back out by reversal of the magnetic coupling, capturing the back portion of the CNT plug before it exits the condensation area of the tube, stopping the flow and allowing additional condensation of carbon to form longer CNT. The cycle repeats at the give frequency of the coupling coil 202 AC current. If the CNT is not forming in pace with the extrusion frequency, causing brakes in the extrusion, the CVD chamber 200 pressure can be decreased or the housing 205 temperature can be decreased, or any combination of both. Once a continuous flow of CNT wire extrusion is established, the coupling frequency can be increased while adjusting the CVD chamber pressure and housing temperatures to maintain a continuous extrusion is highly desirable, since a higher frequency will produce greater lengths of wire in shorter time. If 50 nm of CNT is formed each cycle, then at 530 kHz, 0.0265 meters of CNT wire will be produced per second (95.4 meters/hour).

The process of attaching the outer ends of the grown extrusion template tubes to an oscillation plate can pose difficulties. Since many of the die fabrication processes require unobstructed access to the baseplate and NCA, the oscillation plate needs to be attached to the extrusion template tubes after they are grown and dangling. However, it is possible to eliminate the need for the second movable oscillation plate altogether. It has been shown that the ends of CNT are frayed to some extent, and that these frayed ends accumulate large electron charges. These charges, if held in place, can be used themselves to stretch and compress the template tubes. In addition, it has been shown that by immersing the tubes in a saltwater solution and applying an electric charge to the tubes, the tubes will also expand axially. The chlorine ions bind to the tubes when positively charged, and the sodium ions bind when negatively charged. The binding atoms cause electron displacement on the tubes, causing the tubes to contract and stretch. The displacement and stretching is much greater with a positive charge applied than a negative one. Therefore, by applying an oscillating electric charge to the baseplate, the attached tubes will likewise be charged, and stretch and compress along with the oscillating charge. Other possibilities would be to dope or bond other elements to the CNT to establish a charge throughout the template tube length.

Figure 5:
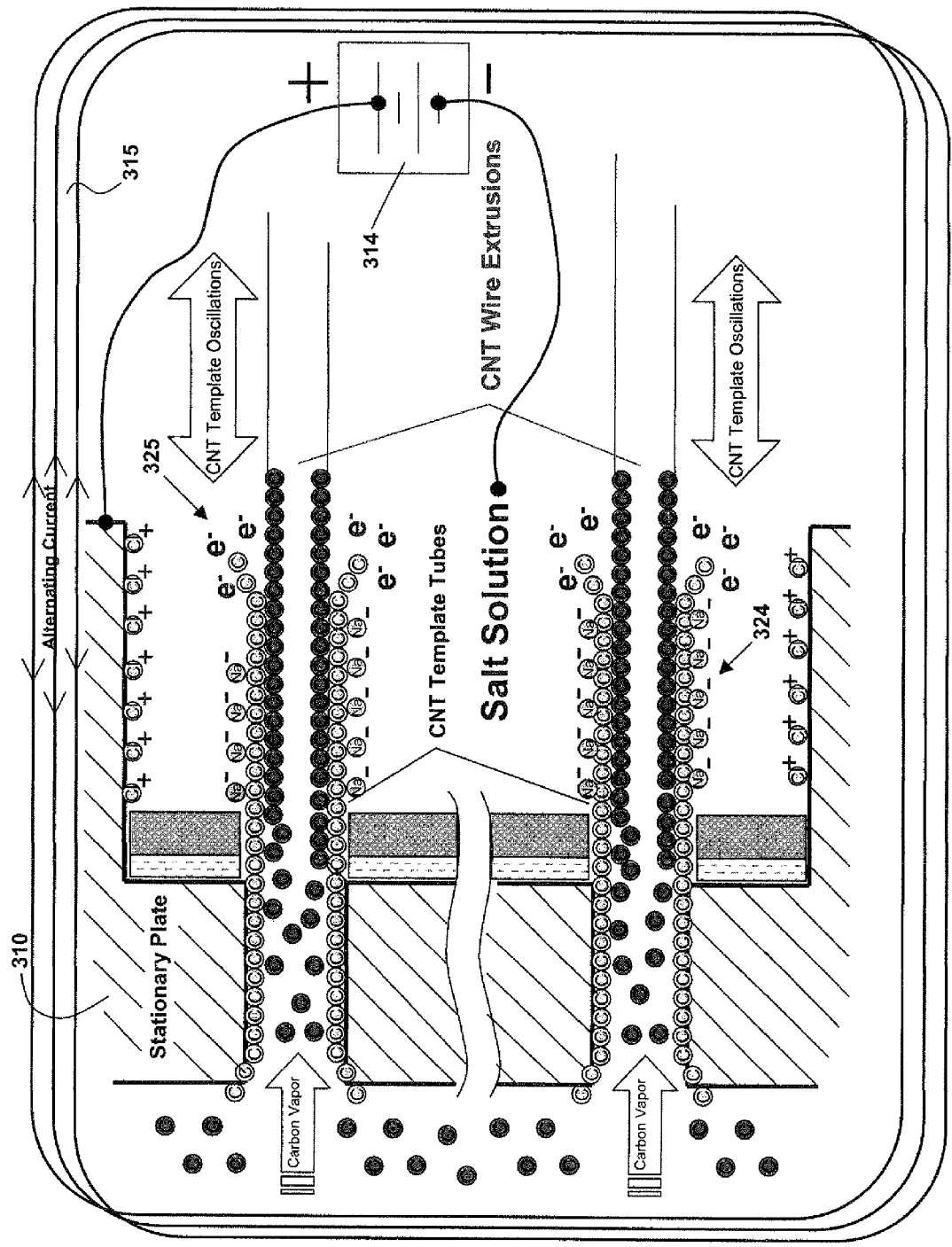
FIG. 5 shows a schematic diagram of a CNT wire extrusion process according to another embodiment of the present invention.

FIG. 5 shows a schematic diagram of a CNT wire extrusion process according to another embodiment of the present invention. Along with applied charge control, it has been demonstrated in electronic memory formation processes that applied fields can also cause the CNT to stretch and bend. In FIG. 5, a combination of applied charge and field effects is shown. The stationary baseplate 310 having through-holes provides carbon vapor to the template tubes 324. A salt solution is used to provide additional ions to the walls of the template tubes 324. Since there is a naturally occurring negative charge build-up on the tube tips 325, the solution is made negatively charged and the baseplate 310 is positively charged by way of a power source 314. This will cause the sodium ions to be drawn to the walls of the template tubes 324 to complement the charged tips 325. Making this charge condition static using a DC source 314, an alternating current 315 in alignment with the tube axis will create an alternating magnetic field perpendicular to the axis of the tubes 324. The coupling between the alternating magnetic field and the static electric charge imposes an electromotive force on the template tubes 324, causing them to stretch and compress axially in tune with the frequency of the AC source 315. The proper oscillation frequency in conjunction with the carbon vapor pressure, will cause the carbon exiting the template tubes to form a CNT wire extrusion in a form and release manner as described above.

The forgoing processes can provide CNT in lengths in excess of 100 µm. Indeed, much longer, even continuous, CNT structures are possible by the foregoing processes. Continuous lengths of CNT wire extrusions can be woven into a fabric which then can be incorporated into composite materials. The composites comprising carbon nanotube segments, extrusions, or continuous extrusions in the form of filaments, fibers, strands, strings, wires, twine, and yarns can be further bonded together by radiation hardening methods. Because of the continuous strands of extremely high tensile strength wire running through the composites, they will be much stronger than any previously made. These new composites then can be used to build high strength, high pressure, light weight fuel tanks and structural components for new space launch vehicles, space transport vehicles, or any other structures. These new materials, of course, can also be used in the aviation industry, making lighter faster and more fuel efficient airplanes and jetliners. in addition, the military can use these new materials to make much stronger and lighter armor for armored vehicles and body armor. The automotive industry can use the new materials for lighter and more fuel efficient cars and trucks, and fabricate very high pressure hydrogen storage tanks. The CNT wire can be used simply as wire for making the strongest cables ever made, for use in suspension bridges for example. Also, CNT wire properly formed can have conductivity 1000 times greater then copper, revolutionizing the power industry with many times smaller and lighter electric motors and power cables. Numerous other possibilities exist for materials fabricated from the CNT extrusion process of the present invention.

Thus, while the invention has been described in connection with one or more embodiments, it should be understood that the invention is not limited to those embodiments. For example, the template tubes can be made of any suitable material for forming carbon nanotubes, including silicon carbide, boron carbide, or any combination of proven catalyst materials such as cobalt, nickel, iron, carbon, or simply a larger carbon nanotube. In this regard, the invention covers all alternatives, modifications and equivalents as may be included within the spirit and scope of the appended claims.

The invention claimed is:

1. A process of forming a carbon nanotube (CNT) comprising:
   providing a source of carbon;
   providing an extrusion die comprising a template tube in fluid communication with the carbon source, the template tube including a catalyst for forming a CNT structure in combination with the carbon source;
   introducing the carbon into the template tube to initially form a CNT structure; and
   thereafter, repeatedly axially oscillating the template tube at a frequency corresponding to a formation rate of the CNT structure to alternately form and release the CNT structure in a continuous manner.

2. A process according to claim 1 wherein the step of axially oscillating the template tube comprises electrically charging the template tube and applying an externally oscillating electric field to the template tube such that it to stretches and compresses in an oscillating manner.

3. A process according to claim 2 further comprising doping the template tube with ions.

4. A process according to claim 2 further comprising surrounding the template tube with an ionized solution.

5. A process according to claim 1 wherein the step of axially oscillating the template tube comprises applying an alternating electric field or magnetic field to a free end of the template tube.

6. A process according to claim 1 wherein the extrusion die comprises a stationary first plate and a moveable second plate, the template tube extending between the two plates, and wherein the step of oscillating comprises oscillating the second plate back and forth with respect to the first plate to alternately axially compress and stretch the template tube at a rate synchronized with a formation rate of he CNT within the template tube.

7. A process according to claim 1 wherein the step of providing an extrusion die comprises providing a porous anodic alumina (PAA) baseplate with an etched hole; electrochemically plugging the hole; anodizing nano-channel alumina (NCA) onto the baseplate, using the plugged hole as an alignment template for a second anodizing process; electrochemically depositing a catalyst into the bottom of the NCA hole, on top of the plug; forming the CNT template tube in the NCA hole by a chemical vapor deposition (CVD) process; etching out the catalyst and plug to leave a clean through-holes through the PAA baseplate and template tube; and, thereafter, etching away a portion of the NCA such that one end of the template tube is connected to and extends from NCA and PAA baseplate, the free end of the template tube capable of being oscillated.

8. A process according to claim 7 wherein the step of providing an extrusion die further comprises, thereafter, depositing an insulating layer and coldplate layer to the NCA layer.

9. A process according to claim 7 wherein the step of axially oscillating the template tube comprises applying an alternating electric field or magnetic field to the free end of the template tube.

* * * * *